US010785357B2

(12) United States Patent
Nielsen

(10) Patent No.: US 10,785,357 B2
(45) Date of Patent: *Sep. 22, 2020

(54) SWIVEL CASE FOR PHONE

(71) Applicant: Gregory F. Nielsen, Oyster Bay, NY (US)

(72) Inventor: Gregory F. Nielsen, Oyster Bay, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/551,637

(22) Filed: Aug. 26, 2019

(65) Prior Publication Data

US 2019/0379775 A1 Dec. 12, 2019

Related U.S. Application Data

(63) Continuation-in-part of application No. 15/953,352, filed on Apr. 13, 2018, now Pat. No. 10,396,841.

(60) Provisional application No. 62/484,951, filed on Apr. 13, 2017.

(51) Int. Cl.
*H04B 1/3888* (2015.01)
*H04M 1/04* (2006.01)

(52) U.S. Cl.
CPC ..................... *H04M 1/04* (2013.01)

(58) Field of Classification Search
CPC combination set(s) only.
See application file for complete search history.

(56) References Cited

U.S. PATENT DOCUMENTS

| 9,407,743 | B1* | 8/2016 | Hirshberg | H04M 1/04 |
| 2011/0259771 | A1* | 10/2011 | Johnson | A45C 11/00 206/320 |
| 2014/0167431 | A1* | 6/2014 | Enkerlin | F16M 11/10 294/142 |
| 2014/0191033 | A1* | 7/2014 | Wojcik | H02J 50/10 235/449 |
| 2015/0009610 | A1* | 1/2015 | London | G06F 1/163 361/679.03 |
| 2016/0028428 | A1* | 1/2016 | Sturniolo | A45C 11/00 455/575.8 |
| 2016/0134733 | A1* | 5/2016 | Murphy | H04B 1/3888 455/575.6 |

* cited by examiner

Primary Examiner — Cindy Trandai
(74) Attorney, Agent, or Firm — Daniel P. Burke & Associates, PLLC; Daniel P. Burke

(57) ABSTRACT

A phone case designed to secure a phone to a user's hand while permitting the user to readily rotate the phone and case relative to his hand without requiring the user to release the phone from his hand. A case body has at least one slot, a portion of which is arcuate. A strap extends from a strap connector on the inside of the case body, outwardly through one of the slots, across a portion of the outside of the case body, and inwardly through a slot. The size of the strap permits a user to slide one or more fingers between the strap and the outside of the case body. The strap slides within the slot(s) when the phone case is rotated relative to a user's hand.

19 Claims, 13 Drawing Sheets

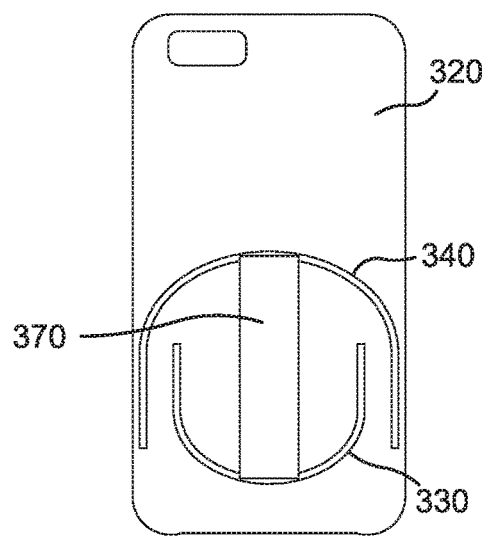
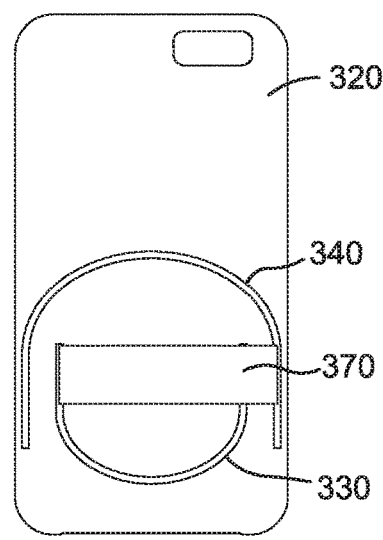
FIG. 31   FIG. 32
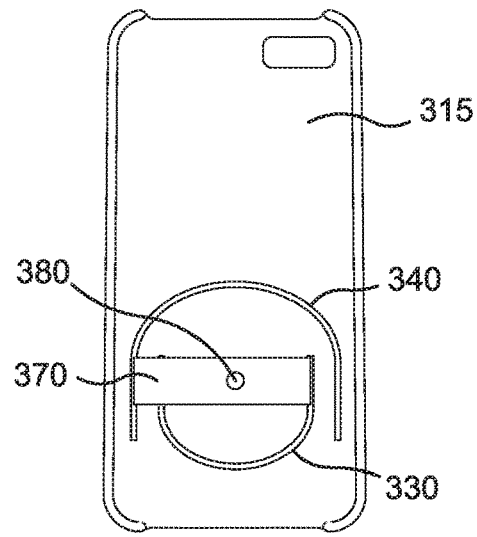
FIG. 33
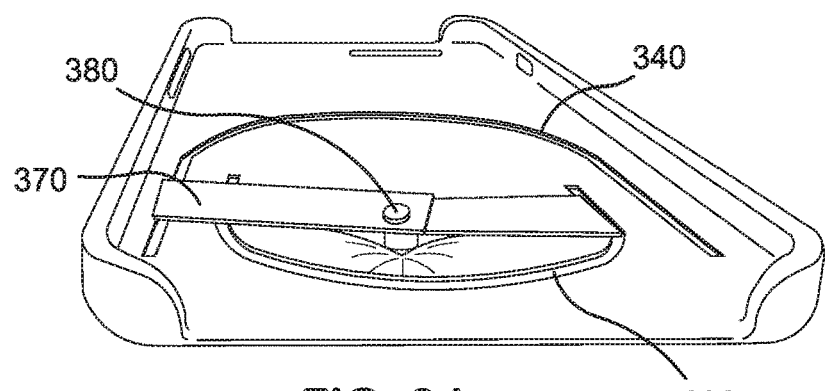
FIG. 34

SWIVEL CASE FOR PHONE

RELATED APPLICATION DATA

This application is a continuation-in-part of U.S. patent application Ser. No. 15/953,352 filed Apr. 13, 2018, now U.S. Pat. No. 10,396,841, which claims the benefit of U.S. Provisional Patent Application No. 62/484,951 filed on Apr. 13, 2017, and which are hereby incorporated by reference.

A phone case facilitates the comfortable and secure holding of a phone by a user while allowing the phone to be selectively swiveled, e.g. through about 90° or 180°, relative to the user's hand.

BACKGROUND

Some phones, particularly cell phones, are sold with smooth outer cases which are susceptible to slipping out of a user's hand. It is common for purchasers of modern cell phones to purchase phone cases to protect their phone. In use, it is sometimes desirable for a user to rotate the phone relative to the user's hand, for example, when the user desires to view or take a photo or video, or play a game.

SUMMARY OF THE INVENTION

The disclosed embodiments provide a phone case designed to secure a phone to a user's hand while permitting the user to readily rotate the phone relative to his hand without requiring the user to release the phone from his hand. The illustrated devices comprise a case body with walls or clips for securing a phone to the case body. The case body also comprises at least one, and preferably a plurality of slots. At least a portion of each slot is arcuate. A strap, preferably an elastic strap, extends from a strap connector on the inside of the case body proximate the phone (the "phone side"), outwardly through one of the slots, across a portion of the outside of the case body (the "user side"), inwardly through another slot, and to the same or another strap connector on the inside of the case body. In this manner the strap is secured to the inside of the case body and extends across a portion of the outside of the case body. The size of the strap and the spacing of the slots are designed to permit a user to slide one or more fingers between the strap and the outside of the case body, and to permit selective additional stretching when desired. During rotation of the phone (and case body) relative to a user's hand, the strap slides within the slots in the case body.

BRIEF DESCRIPTION OF THE DRAWINGS

FIG. 31 is a top view of a phone case of a fourth embodiment showing the strap in a longitudinal orientation.

FIG. 32 is a top view of the phone case of FIG. 31 showing the strap in a lateral orientation.

FIG. 33 is a bottom view of the phone case of FIG. 31 showing the strap in a lateral orientation.

FIG. 34 is a bottom, end perspective view of the phone case shown in FIG. 31.

DETAILED DESCRIPTION

FIGS. 1-17 illustrate a phone case of a first embodiment. The illustrated phone case comprises a case body 10 and a strap 70. The case body 10 comprises an inner side 15 adapted to selectively and securely attach to a phone (not shown) and an outer side 20 which generally faces the fingers on the hand holding the phone case while talking on the phone.

Figure 1:
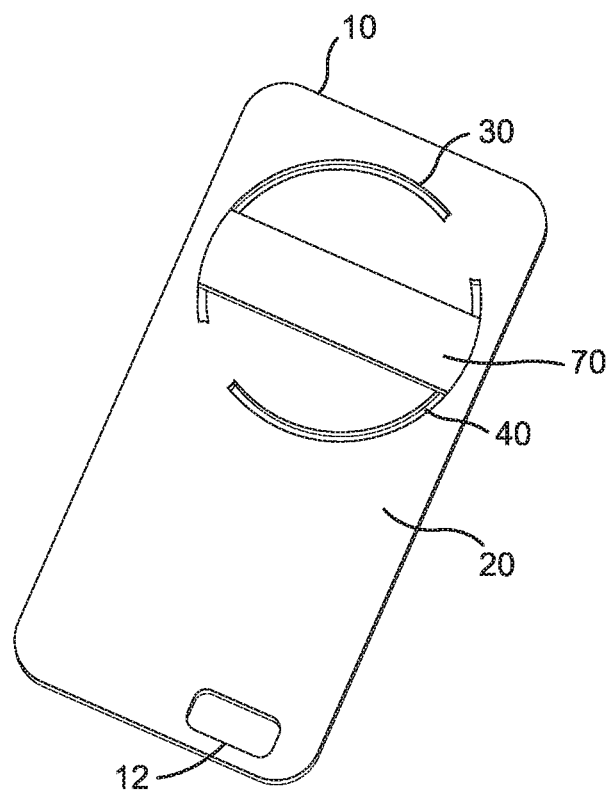
FIG. 1 is a top, perspective view of a phone case of one embodiment.
Figure 2:
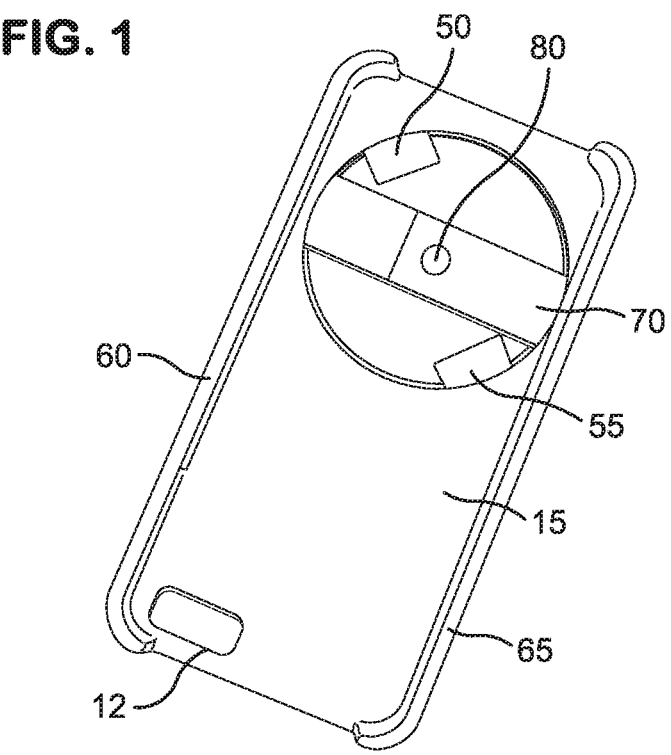
FIG. 2 is a bottom, perspective view of the phone case shown in FIG. 1.
Figure 3:
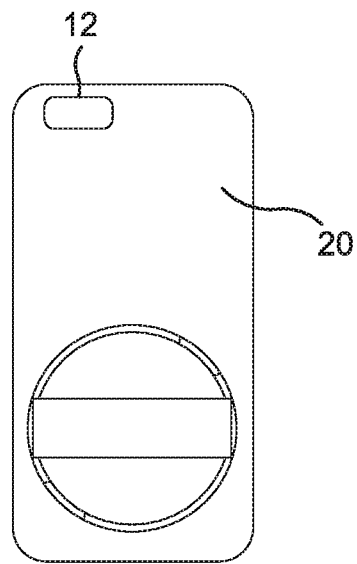
FIG. 3 is a top view of the phone case of FIG. 1 showing the strap in a lateral orientation.
Figure 4:
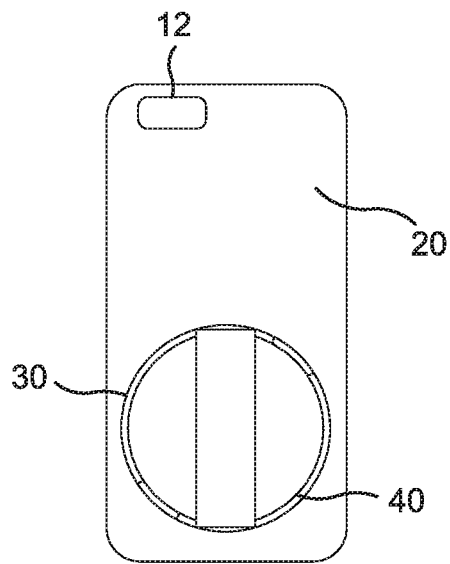
FIG. 4 is a top view of the phone case of FIG. 1 showing the strap in a longitudinal orientation.
Figure 5:
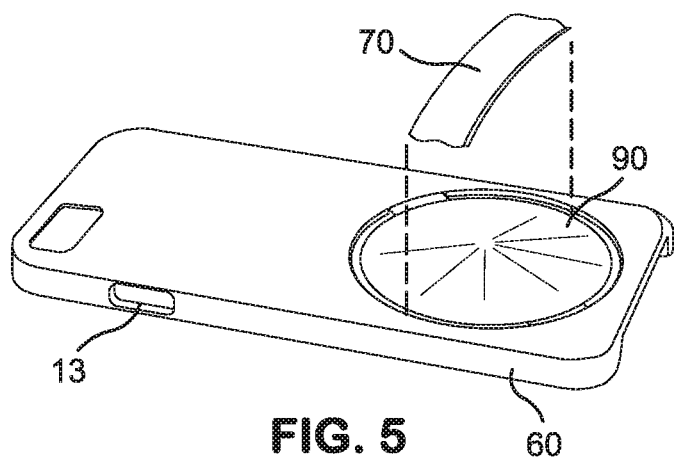
FIG. 5 is a partially exploded, top perspective view of the phone case shown in FIG. 1.
Figure 6:
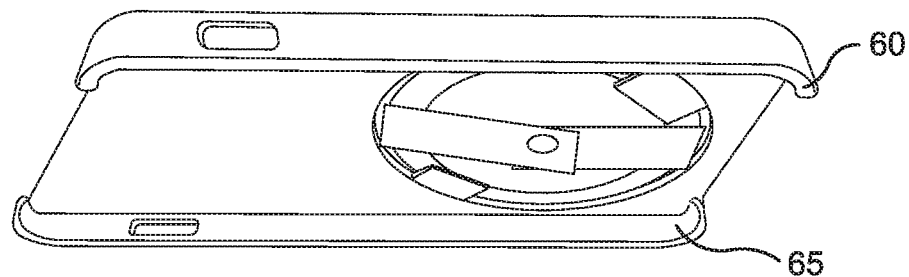
FIG. 6 is a bottom perspective view of the phone case shown in FIG. 1.
Figure 7:
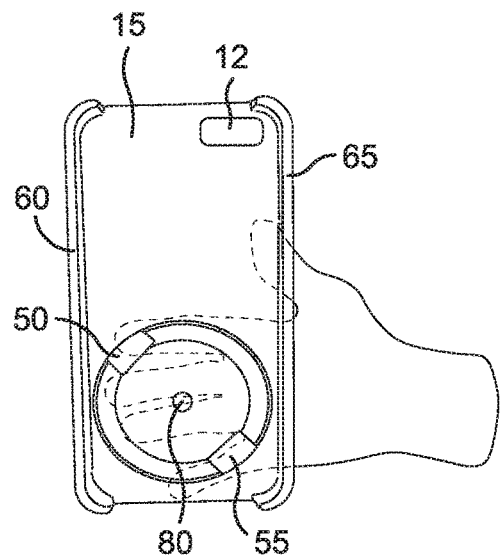
FIG. 7 is a bottom perspective view of the case body shown in FIG. 1 with a hand shown extending laterally relative to the case body.
Figure 8:
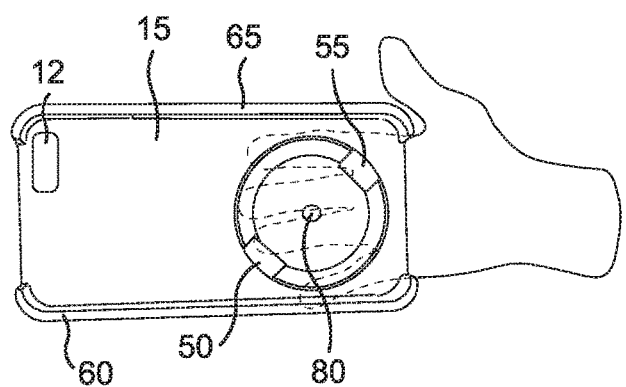
FIG. 8 is a bottom perspective view of the case body shown in FIG. 1 with a hand shown extending longitudinally relative to the case body.
Figure 9:
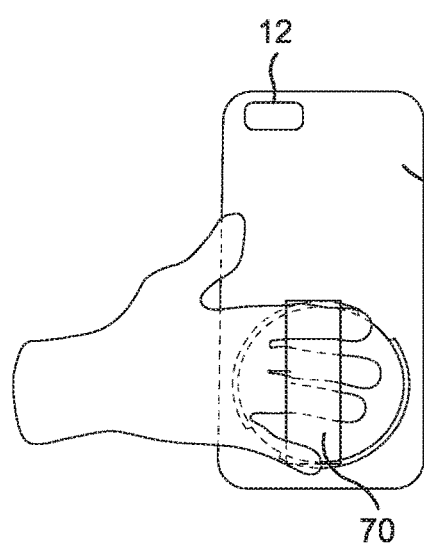
FIG. 9 is a top view of the phone case shown in FIG. 1 with a hand shown extending laterally relative to the case body.
Figure 10:
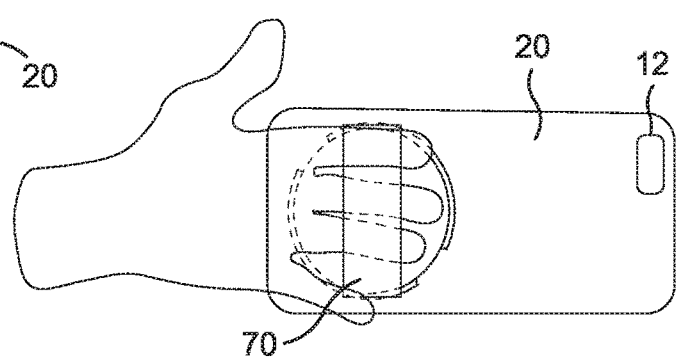
FIG. 10 is a top view of the phone case shown in FIG. 1 with a hand shown extending longitudinally relative to the case body.
Figure 11:
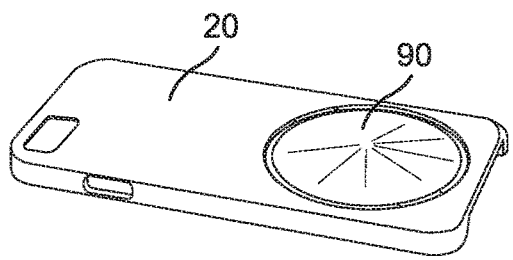
FIG. 11 is a top perspective view of the case body shown in FIG. 1.
Figure 12:
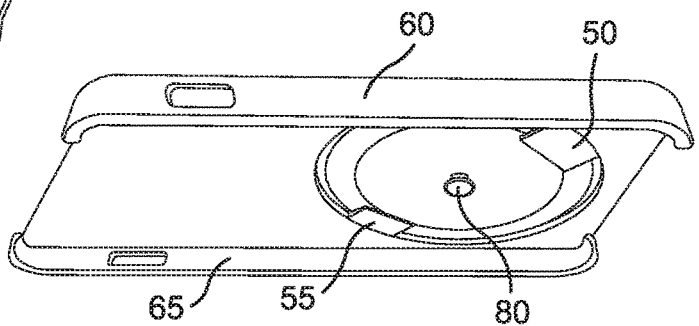
FIG. 12 is a bottom, side perspective view of the case body shown in FIG. 1.
Figure 13:
FIG. 13 is a side perspective view of the case body shown in FIG. 1.
Figure 14:
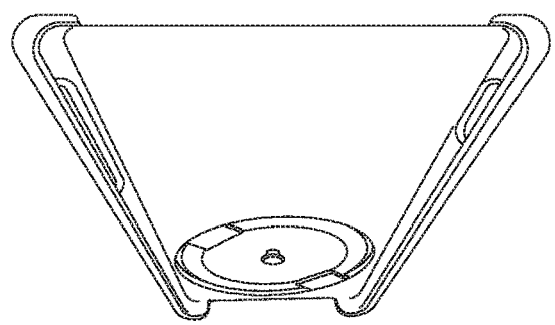
FIG. 14 is a bottom, end perspective view of the case body shown in FIG. 1.
Figure 15:
FIG. 15 is a side view of the case body shown in FIG. 1.
Figure 16:
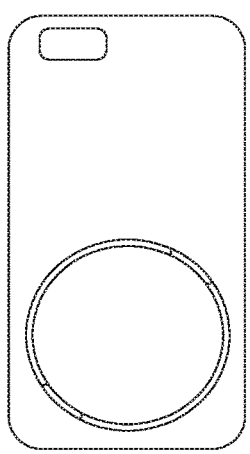
FIG. 16 is a top view of the case body shown in FIG. 1.
Figure 17:
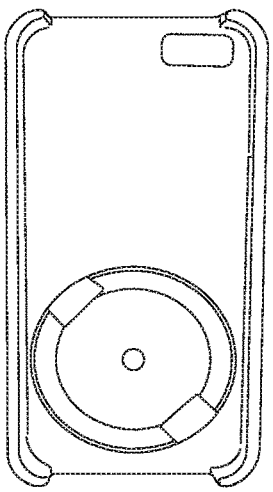
FIG. 17 is a bottom view of the case body shown in FIG. 1.
Figure 18:
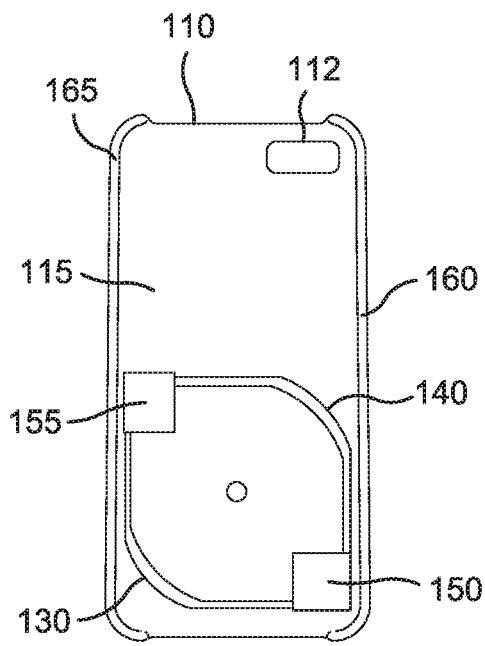
FIG. 18 is a bottom view of a case body of a second embodiment.
Figure 19:
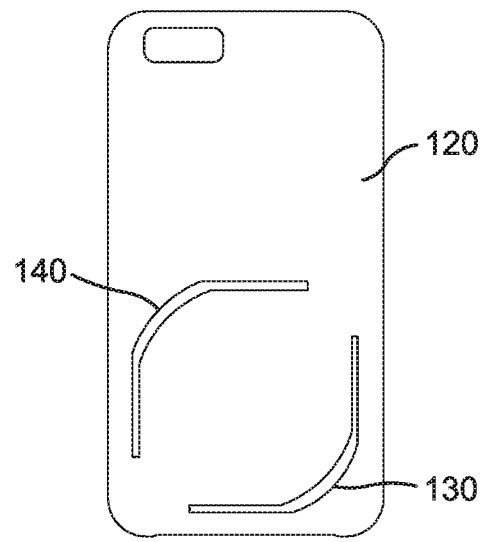
FIG. 19 is a top view of the case body shown in FIG. 18.
Figure 20:
FIG. 20 is a side view of the case body shown in FIG. 18.
Figure 21:
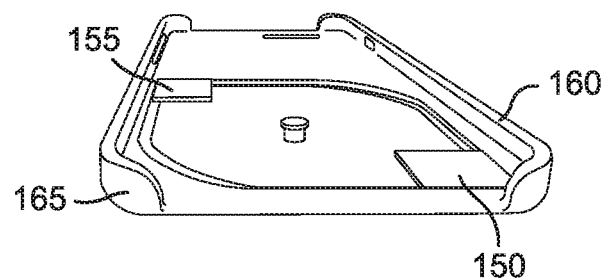
FIG. 21 is a bottom, end perspective view of the case body shown in FIG. 18.
Figure 22:
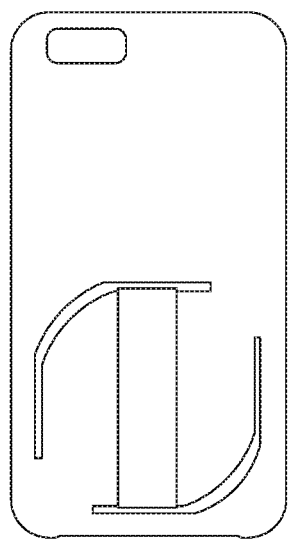
FIG. 22 is a top view of the phone case of FIG. 18 showing the strap in a longitudinal orientation.
Figure 23:
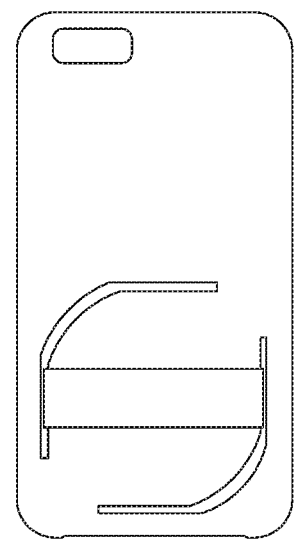
FIG. 23 is a top view of the phone case of FIG. 18 showing the strap in a lateral orientation.
Figure 24:
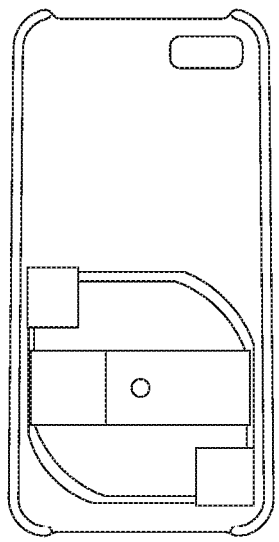
FIG. 24 is a bottom view of the phone case of FIG. 18 showing the strap in a lateral orientation.
Figure 25:
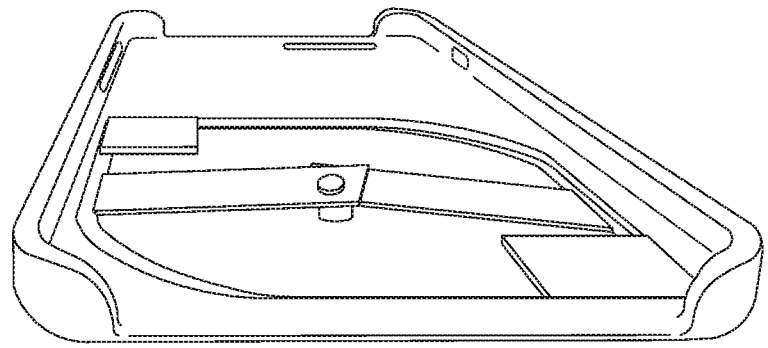
FIG. 25 is a bottom, end perspective view of the phone case shown in FIG. 18.
Figure 26:
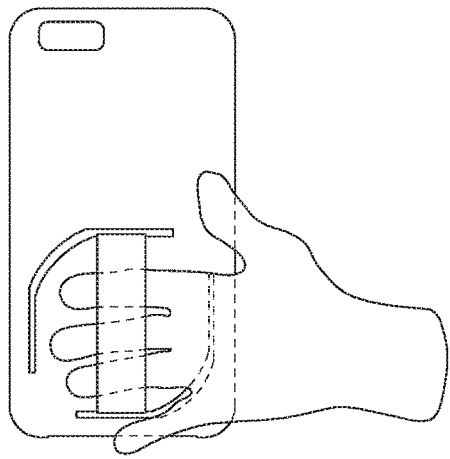
FIG. 26 is a top view of the phone case shown in FIG. 18 with a hand shown extending laterally relative to the case body.
Figure 27:
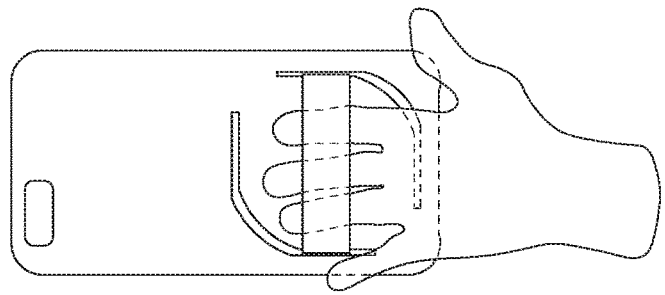
FIG. 27 is a top view of the phone case shown in FIG. 18 with a hand shown extending longitudinally relative to the case body.
Figure 28:
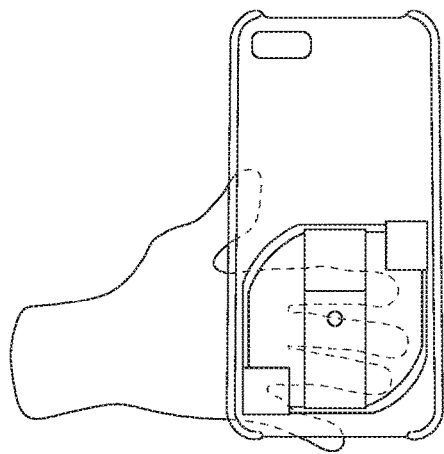
FIG. 28 is a bottom perspective view of the phone case shown in FIG. 18 with a hand shown extending laterally relative to the case body.
Figure 29:
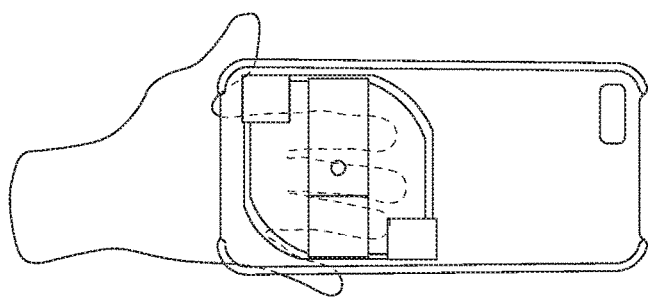
FIG. 29 is a bottom perspective view of the phone case shown in FIG. 18 with a hand shown extending longitudinally relative to the case body.

The inner side 15 comprises an attachment button 80 which extends outwardly from the surface of inner side 15. As best shown in FIGS. 12 and 14, the illustrated attachment button 80 comprises a stein and a flange for securely and releasably attaching a strap to the inner side by passing the button 80 through holes in the strap. The surface of the outer side 20 of case body 10 can be substantially flat, but is preferably formed with a shallow cone shape proximate the portion where the strap is attached.

The case bodies are provided with walls or clips for releasably securing a phone to the case body. The illustrated case bodies are provided with resilient side walls which allow a phone to be selectively snap fit into the case body. Case body 10 comprises sidewalls 60, 65 which extend the length of the case body and extend inwardly to wrap partially around the ends of a phone. Other configurations can be used. The case body is also preferably formed with suitable access holes, such as camera hole 12 and switch hole 13, to allow a user access to all buttons and switches on the phone and so not to interfere with other functional components such as cameras and microphones on the phone.

The case body also comprises at least one, and preferably a plurality of slots which receive portions of at least one strap while permitting the strap to slide relative to the case body when desired. At least a portion of each slot is arcuate. In this illustrated embodiment, a strap 70, preferably an elastic strap, extends from a strap connector 80 on the inside 15 of the case body 10 proximate the phone (the "phone side"), outwardly through one of the slots 40, across a portion of the outside 20 of the case body 10 (the "user side"), inwardly through another slot 30, and to the same or another strap connector 80 on the inside of the case body. In this manner the strap 70 is secured to the inside of the case body and extends across a portion of the outside of the case body.

The length, and preferably the elasticity, of the strap 70 and the spacing of the slots 30, 40 are designed to permit a user to slide one or more fingers between the strap 70 and the portion of the outside 20 of the case body 10 between slots 30 and 40, and to allow further selective stretching of the strap by the user. During rotation of the phone case (and phone) relative to a user's hand, the strap 70 slides circumferentially within the slots 30, 40 in the case body 10.

The stretchable nature of preferred straps provides an advantage during use. It has been found that if the strap is properly sized and suitably elastic, when a user has his fingers in a relaxed configuration, the strap exerts a force directed toward the center of an imaginary circle on which the arcuate slots lie. This inwardly directed force is sufficient to prevent the phone case (and phone) from rotating relative to the user's hand when the user is talking. However, when the user wishes to rotate the phone case (and phone) relative to his hand, the frictional force exerted by the strap on the slots can easily be reduced by the user by simply spreading the fingers which are under the strap. This facilitates easy rotation of the case body relative to the strap. The fingers can be spread beyond the perimeter of the slots. It has also been found that if the fingers are spread to a degree which gets close to the perimeter of the slots, the degree to which the strap contacts the surface of the phone body defining the inner portion of the slot is reduced and this results in less frictional force between the strap and the case body thereby facilitating easy circumferential movement of the strap relative to the case body, i.e. the rotation of the phone case (and phone) relative to the user's hand.

The illustrated strap 70 comprises at least two holes (not shown) proximate each end, and preferably a greater number of holes spaced along the longitudinal axis of the strap to allow adjustment to the amount of the strap in use for different size fingers and other user preferences.

The strap 70 slides in the two arcuate slots 30, 40 in the case body 10. While various size and shape slots can be utilized, the illustrated arcuate shape of slots 30, 40 allows the strap to swivel more than 90 degrees relative to case body 10, thereby allowing the phone user to hold his phone upright and then turn his phone on its side while still wearing the strap, i.e. the illustrated phone case rotates more than 90 degrees relative to the user's fingers. The strap is also able to easily rotate around the button on the inner side of the case body.

Figure 35:
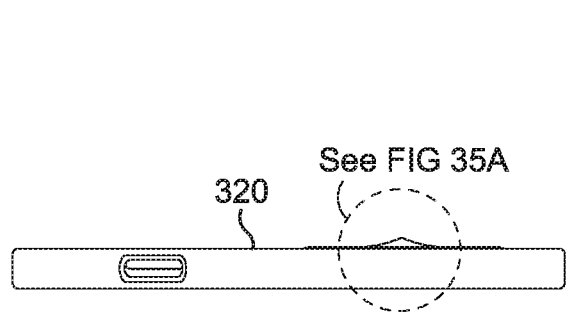
FIG. 35 is a side view of the case body shown in FIG. 31.
Figure 35A:
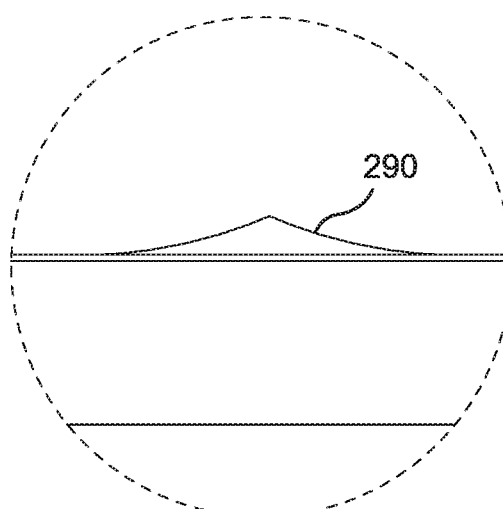
FIG. 35A is a close-up, side view of the raised, finger portion of the top surface of the case body shown in FIG. 31.
Figure 36:
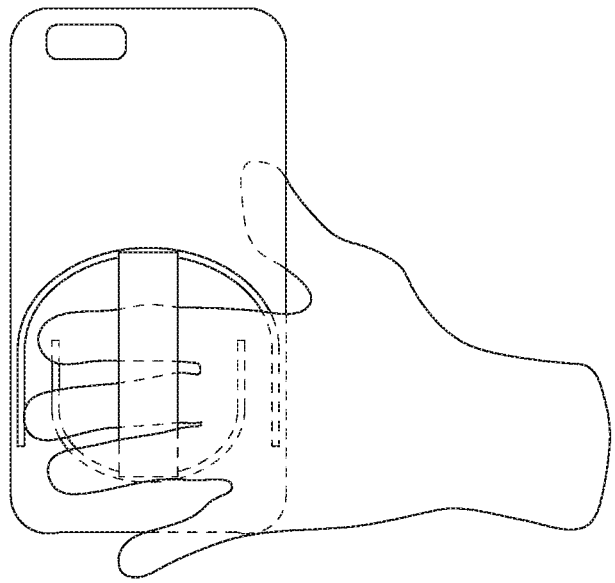
FIG. 36 is a top view of the phone case shown in FIG. 31 with a left hand shown extending laterally relative to the case body.
Figure 37:
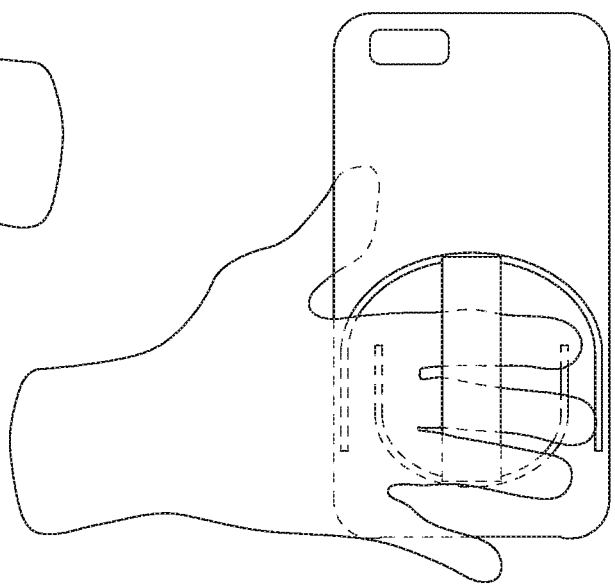
FIG. 37 is a top view of the phone case shown in FIG. 31 with a right hand shown extending laterally relative to the case body.
Figure 38:
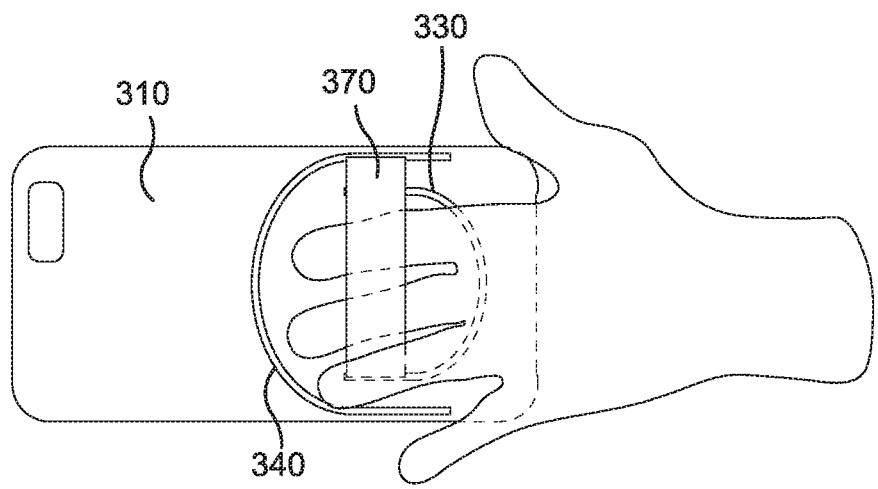
FIG. 38 is a top view of the phone case shown in FIG. 31 with a left hand shown extending longitudinally relative to the case body.
Figure 39:
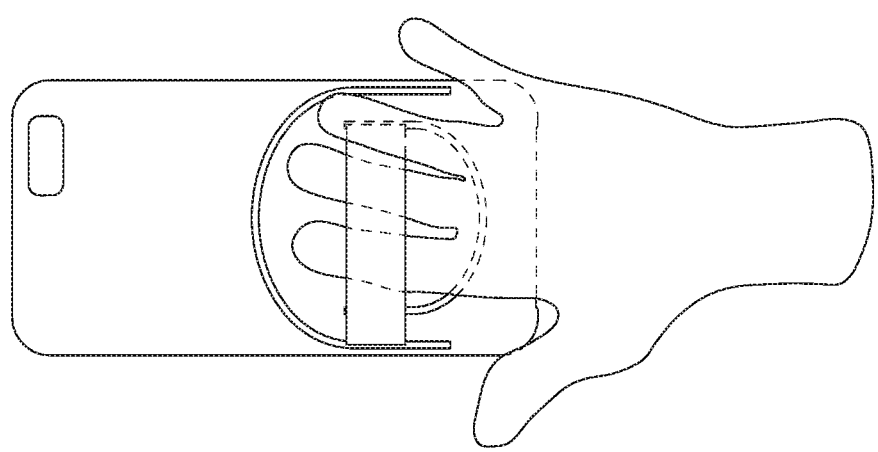
FIG. 39 is a top view of the phone case shown in FIG. 31 with a right hand shown extending longitudinally relative to the case body.

As best shown in FIGS. 5, 11, 13 and 15, the portion of the outer surface of case body 10 between slots 30, 40 is preferably raised relative to the rest of the outer side of case body 10. In this illustrated embodiment, the raised portion 90 is generally in the form of a shallow cone. This conical shape between the arcuate slots allows a user's fingers to rest comfortably while the apex of the cone acts as a pivot point for the phone rotation. The raised portion can alternatively be frustoconical or can have a rounded apex. FIG. 35A illustrates a raised portion 290 with slightly curved sides. Other shapes of raised surfaces can also be utilized. The portion of the outer surface 20 of case body 10 between slots 30, 40 is not necessarily raised and can be generally in the same plane as other portions of the outer surface 20 of case body 10.

The case body 10 in FIGS. 1-17 is provided with two connection flanges 50, 55 which connect the generally circular structure inside the imaginary circumference defined by slots 30, 40 with the rest of the case body. The connection flanges 50, 55 provide support and some rigidity to the portion of the case body 10 between the slots 30, 40, while also serving as stops to the circumferential movement of the portions of strap 70 moving within the slots 30, 40. The stopping action of the connection flanges 50, 55 helps to prevent the strap 70 from getting twisted or tangled on itself during use.

FIGS. 18-29 illustrate a second embodiment where similar elements are labelled with a number which is 100 greater than the corresponding element shown in FIGS. 1-17. The embodiment shown in FIGS. 18-29 is generally similar to the earlier embodiment with the exception of the shape of the slots 130, 140 which each have a central arcuate portion and two generally linear, terminal portions.

Figure 30:
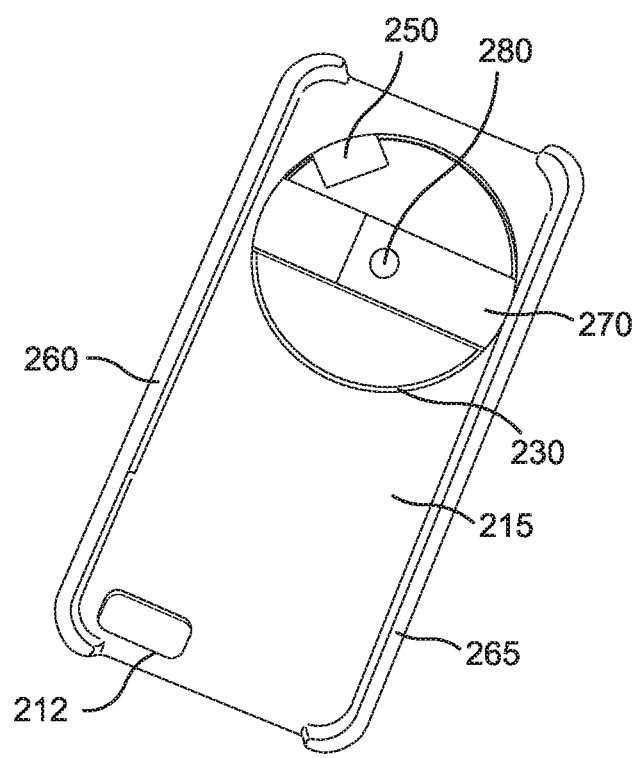
FIG. 30 is a bottom perspective view of a phone case of a third embodiment.

FIG. 30 is a bottom perspective view of a phone case of a third embodiment comprising only a single slot 230. This illustrated embodiment comprises a single connection flange 250 which connects the portions of the case body otherwise separated by slot 230 and also serves as a stop to strap 270 as strap 270 is moved circumferentially within slot 230. A single slot allows a greater range of angular rotation of strap 270 relative to the case body but a single connection flange 250 does not provide as much support or rigidity as two connection flanges.

FIGS. 31-39 illustrate a fourth embodiment comprising two, generally overlapping and generally U-shaped slots 330 and 340. In this embodiment, slot 330 comprises a curved lower end portion and two, generally linear portions which extend upwardly in the case body. Slot 340 comprises a downwardly curving upper portion which is positioned spaced and opposite the curved lower portion of slot 330. Slot 340 also has two, generally linear portions which extend downwardly in the case body. Since slot 340 is larger than slot 330, the downwardly extending generally linear portion of slot 340 are positioned outwardly of, i.e. closer to the lateral sides of the case body than, the generally, linear portions of slot 330. For purposes of this embodiment, the terms up and down are used for purposes of reference and correspond to the orientation of the case body as the case body is oriented in FIG. 31. In this embodiment, strap 370 is provided with slits and is secured to an attachment anchor 380 in a manner similar to that described above with respect to the first embodiment. The shape and positioning of slots 330 and 340 permit the case body to be rotated through at least 135°, and preferably 180°, without changing the hand which is holding the phone. FIGS. 36-39 also illustrate that the phone can be maintained in the same orientation with either the right or the left hand of the user and rotated through at least 180°. For example, from FIG. 38 it will be appreciated that the case body 310 can be rotated clockwise relative to the strap 370. During this rotation, the strap 370 slides circumferentially in each of slots 330 and 340 so that the strap 370 ends up positioned in the opposite, generally linear portions of the respective slots.

Figure 40:
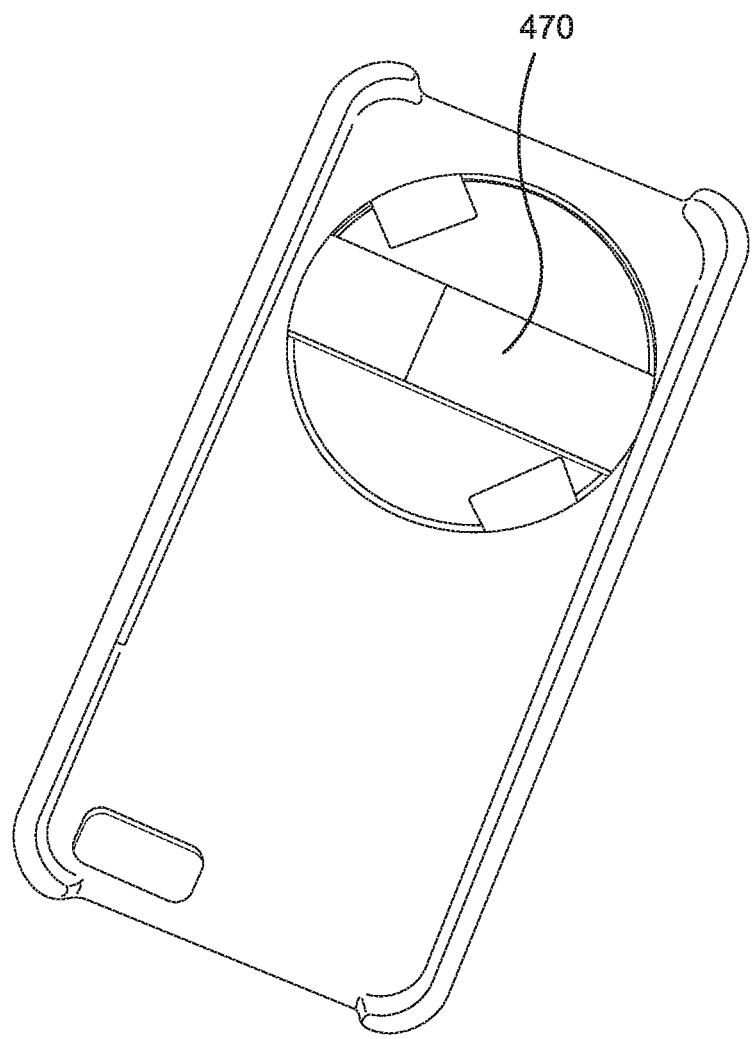
FIG. 40 is a bottom, perspective view of the phone case of a fifth embodiment.

FIG. 40 illustrates a fifth embodiment comprising a strap 470 in the form of a continuous loop. The illustrated strap 470 is slightly overlapping and secured to itself with an adhesive and/or stitching (not shown). This embodiment does not comprise an attachment button or attachment anchor for strap 470 as does the other illustrated embodiments. In other respects, the embodiment shown in FIG. 40 is similar to the embodiment shown in FIGS. 1-17.

Figure 41:
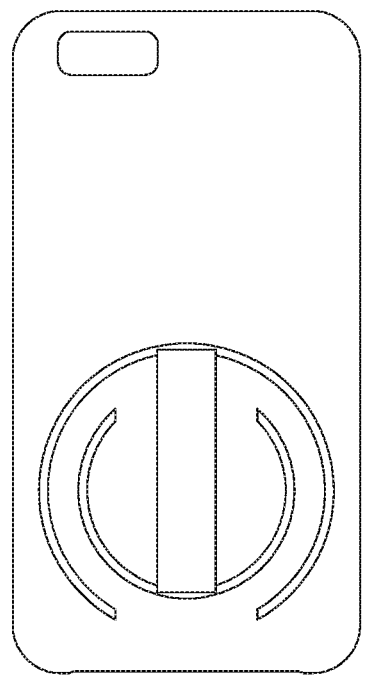
FIG. 41 is a top view of a sixth embodiment.

FIG. 41 shows an alternate embodiment wherein two slots are continuously arcuate.

Figure 42:
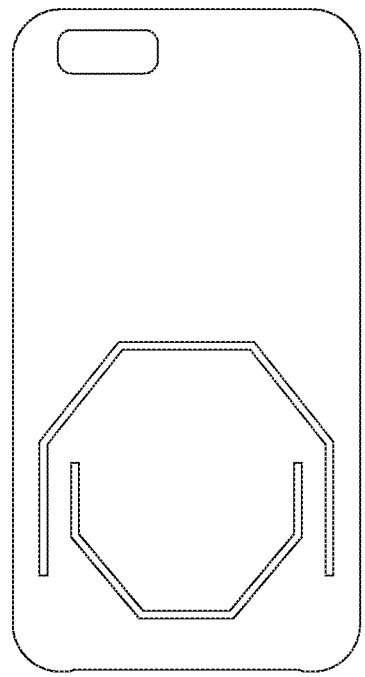
FIG. 42 is a top view of a seventh embodiment.

FIG. 42 shows a still further embodiment comprising two slots wherein each of the slots comprises five linear segments linked to form a continuous, generally U-shaped slot.

The various embodiments are useful to people who like to take selfies since when a user's arm is extended to take a photo, the strap holds the phone in place and the user is less likely to drop their phone because they are not balancing the phone on their fingers. Additionally, since many phone games require players to have their phone horizontal during play it is beneficial to have the strap because a player can relax his fingers which are inserted between the strap and the case body. This advantageously reduces fatigue on the player's hand. Additionally, when the strap is properly sized and tensioned, the user will not lose control of or drop his phone even when his hand (to which the phone case is connected via the strap) is relaxed.

The invention claimed is:

1. A phone case comprising:
a case body comprising:
a phone side and a user side;
flexible attachment structure for securing a phone to said phone side;
at least one slot extending through said case body between said phone side and said user side, said at least one slot comprising an arcuate portion which defines a continuous opening with an arc of at least 180°; and
a strap extending through said at least one slot and slidably movable within said slot whereby the case body can be rotated through an angle of about 180° relative to said strap when said strap is fastened to a user's fingers.

2. A phone case according to claim 1 wherein said case body comprises two slots.

3. A phone case according to claim 2 wherein said user side of said case body comprises a raised surface between portions of said slots.

4. A phone case according to claim 3 wherein said raised surface is generally conical.

5. A phone case according to claim 3 wherein said raised surface comprises curved sides.

6. A phone case according to claim 2 wherein said slots are entirely arcuate.

7. A phone case according to claim 2 wherein said slots each comprise a portion which is arcuate and at least one portion which is generally linear.

8. A phone case according to claim 2 wherein each of said slots comprise a portion which is arcuate and at least two portions which are generally linear.

9. A phone case according to claim 2 wherein each of said slots comprise a portion which is arcuate and two portions which are generally linear.

10. A phone case according to claim 2 wherein said case body comprises a strap connector, said strap is rotatably connected to said strap connector, said strap extends from said strap connector outwardly through a first one of said slots, over a portion of the user side of said case body and inwardly through a second one of said slots.

11. A phone case according to claim 10 wherein said portion of the user side of said case body over which said strap extends comprises a raised surface.

12. A phone case according to claim 1 wherein said strap is stretchable.

13. A phone case comprising:
a case body comprising:
a phone side, a user side, a flexible attachment structure for securing a phone to said phone side;
two slots extending through said case body between said phone side and said user side, each of said slots comprising a continuous opening which transverses an angle of about 180°; and
a strap extending through said slots and slidably movable within said slots whereby the case body can be rotated through an angle of about 180° relative to said strap when said strap is fastened to a user's fingers.

14. A phone case according to claim 13 wherein said strap is stretchable.

15. A phone case according to claim 13 wherein said user side of said case body comprises a raised surface between portions of said slots.

16. A phone case according to claim 13 wherein said raised surface is generally conical.

17. A phone case according to claim 13 wherein said raised surface comprises curved sides.

18. A phone case according to claim 13 wherein said portion of the outside of said case body over which said strap extends comprises a raised surface.

19. A phone case according to claim 18 wherein said raised surface is generally conical.

* * * * *